(12) United States Patent
Lenzenhuber et al.

(10) Patent No.: US 12,433,689 B2
(45) Date of Patent: Oct. 7, 2025

(54) APPARATUS FOR THE REGISTRATION OF SURGICAL INSTRUMENTS

(71) Applicant: Aesculap AG, Tuttlingen (DE)

(72) Inventors: Frederick Lenzenhuber, Tuttlingen (DE); Roland-Alois Hoegerle, Tuttlingen (DE); Matthias Schweizer, Tuttlingen (DE)

(73) Assignee: Aesculap AG, Tuttlingen (DE)

( * ) Notice: Subject to any disclaimer, the term of this patent is extended or adjusted under 35 U.S.C. 154(b) by 101 days.

(21) Appl. No.: 18/508,438

(22) Filed: Nov. 14, 2023

(65) Prior Publication Data

US 2024/0156545 A1    May 16, 2024

(30) Foreign Application Priority Data

Nov. 14, 2022  (DE) ...................... 10 2022 130 061.7

(51) Int. Cl.
*A61B 34/20*  (2016.01)
*A61B 90/98*  (2016.01)
(Continued)

(52) U.S. Cl.
CPC .............. *A61B 34/20* (2016.02); *A61B 90/98* (2016.02); *G06K 19/07773* (2013.01);
(Continued)

(58) Field of Classification Search
CPC .. A61B 34/20; A61B 90/98; G06K 19/07773; G16H 40/20; G06Q 10/87; G06Q 10/0875
(Continued)

(56) References Cited

U.S. PATENT DOCUMENTS 5,039,495 A * 8/1991 Kutner ............... B65D 81/3461
250/455.11
10,332,373 B1 * 6/2019 Dehmubed ........ G08B 13/2417
(Continued)

FOREIGN PATENT DOCUMENTS

DE    202018107047 U1    1/2019
DE    102020114412 A1    12/2021
(Continued)

OTHER PUBLICATIONS

Search Report received in German Application No. 10 2022 130 061.7 dated Jul. 10, 2023, with translation, 11 pages.

*Primary Examiner* — Edwyn Labaze
(74) *Attorney, Agent, or Firm* — Christopher A. Rothe; CM Law

(57) ABSTRACT

An apparatus can detect surgical instruments provided with RFID transponders. The apparatus has a receiving space delimited by a bottom and side walls. A surgical instrument can be introduced into the receiving space through an upper side of the receiving space. The receiving space is shielded from external electromagnetic waves at the bottom and at the sides by shielding. An antenna device is configured within the shielding in at least two side walls that extend transversely to one another and/or parallel to one another, in such a way that the antenna device can transmit electromagnetic waves into the receiving space and receive electromagnetic waves from the receiving space with respect to two different sides of the receiving space. An identification device is configured to identify a surgical instrument introduced into the receiving space and store identification data corresponding to the identification of the surgical instrument.

16 Claims, 6 Drawing Sheets

(51) Int. Cl.
    *G06K 19/077*     (2006.01)
    *G16H 40/20*     (2018.01)
    *A61B 90/70*     (2016.01)

(52) U.S. Cl.
    CPC ...... *G16H 40/20* (2018.01); *A61B 2034/2051* (2016.02); *A61B 90/70* (2016.02)

(58) Field of Classification Search
    USPC .......................... 235/385, 375, 487; 705/28
    See application file for complete search history.

(56) References Cited

U.S. PATENT DOCUMENTS

| | | | | |
|---|---|---|---|---|
| 2013/0001305 A1* | 1/2013 | Fleck | ...................... | A61F 13/44 235/385 |
| 2013/0196456 A1* | 8/2013 | Morvan | ............ | H01L 21/02107 438/694 |
| 2018/0153639 A1 | 6/2018 | Wehrle et al. | | |
| 2022/0313388 A1 | 10/2022 | Tamarozzi et al. | | |

FOREIGN PATENT DOCUMENTS

| | | | | |
|---|---|---|---|---|
| DE | 102020125114 A1 | 3/2022 | | |
| EP | 3302340 B1 | 4/2019 | | |
| WO | WO-2015076746 A1 * | 5/2015 | ............. | A61B 50/13 |
| WO | 2021038610 A1 | 3/2021 | | |

\* cited by examiner

APPARATUS FOR THE REGISTRATION OF SURGICAL INSTRUMENTS

CROSS-REFERENCE TO RELATED APPLICATION(S)

This application claims priority under 35 U.S.C. § 119 to German Application No. 10 2022 130 061.7, filed on Nov. 14, 2022, the content of which is incorporated by reference herein in its entirety.

FIELD

The present disclosure relates to an apparatus for registering surgical instruments during a reprocessing of the surgical instruments in a sterile processing department (SPD) for medical products and/or during a count check (i.e. during a "surgical count") in an operating room and/or during the preparation of the instruments for an upcoming operation on a patient, for example during a commissioning/assembly of new trays, during a booking or scan of trays/instruments for a work step or for an operation, during a scan of a tray and assignment to an operating room (Instrument for Patient Tracking) and/or during a marking of the instrument in the operating room as defective (Instrument for Patient Tracking). a scan of trays/instruments for a work step or for an operation, during a scan of a tray and assignment to an operating room (instrument for patient tracking) and/or during marking of the instrument in the operating room as defective (for example with a readout apparatus and corresponding software). The apparatus according to the disclosure is configured to be able to detect surgical instruments that are each provided with at least one RFID transponder. For this purpose, the apparatus is configured to be able to transmit electromagnetic waves to a surgical instrument to be detected for communication with an RFID transponder and to receive them from the surgical instrument to be detected.

BACKGROUND

A conventional apparatus for registering surgical instruments is disclosed, for example, in WO 2021/038 610 A1. The conventional apparatus is configured to be able to recognize surgical instruments by means of an optical identification unit. For this purpose, the identification unit is used to take an image of a surgical instrument to be registered, which is then compared with stored image data. If the image taken matches the stored image data to a sufficient degree, the registration of an instrument corresponding to the stored image data is noted in the apparatus. The problem with optical recognition is that if several surgical instruments are registered, images have to be taken of the individual surgical instruments, which takes a lot of time.

SUMMARY

The object of the present disclosure is therefore to provide an apparatus for the registration of surgical instruments each provided with at least one RFID transponder, which is configured to enable the registration of several surgical instruments in a short time.

An apparatus according to the disclosure is suitable for registering surgical instruments provided with at least one RFID transponder during a reprocessing of the surgical instruments in a sterile processing department (SPD) for medical products and/or during a count check in an operating room.

The apparatus according to the disclosure comprises a receiving space, a shielding, an antenna device and an identification device.

A lower side of the, in particular at least substantially cuboid, receiving space is bounded by a bottom and all (lateral) sides of the receiving space are bounded by side walls. An upper side of the receiving space is configured in such a way that at least one of the surgical instruments can be inserted into the receiving space through the upper side of the receiving space. The apparatus can have a lid by means of which the upper side of the receiving space can be temporarily closed.

The shielding is arranged on or in the bottom and side walls in such a way that the receiving space is shielded from external electromagnetic waves at the bottom and sides. The term "external electromagnetic waves" refers to electromagnetic waves whose origin is outside the receiving space.

The antenna device is configured within the shielding in at least two side walls of the side walls delimiting the receiving space, which extend transversely, in particular perpendicularly, at a distance from each other and/or parallel to each other. In other words, "configured within the shielding" means that the shielding extends around the antenna device. The antenna device is configured in such a way that the antenna device can transmit electromagnetic waves into the receiving space and receive them from the receiving space for communication with an RFID transponder at least with regard to two different sides of the receiving space. In particular, the antenna device can be configured in such a way that electromagnetic waves can be transmitted in the direction of a center of the receiving space.

The identification device is configured, in a case in which at least one of the surgical instruments is introduced into the receiving space, to be able to identify the at least one surgical instrument introduced into the receiving space by means of the identification device and to be able to store identification data corresponding to the identification of the at least one surgical instrument introduced into the receiving space.

"Identify" means that the identification device is capable of reading or recognizing electromagnetic waves emitted or modified by the RFID transponder in response to electromagnetic waves emitted or modified by the antenna device.

In particular, the identification data may include an identifier of an RFID transponder located in the receiving space, for example an article number or a unique identification number of a corresponding surgical instrument. The identification data can also include a time of identification. Additionally or alternatively, the identification data can include a number of cycles of a reusable surgical instrument and/or, particularly in a sterile goods preparation process, information about the type of packaging of the surgical instrument. If the number of cycles is exceeded and/or in the case of a wrong type of packaging, an operator can be informed by means of a display or an alarm, for example. For example, the apparatus can be configured to instruct the operator to remove a specific instrument from a tray and/or place it in a predetermined (different) tray.

By providing an at least partially shielded receiving space, it is advantageously possible to detect several surgical instruments simultaneously.

According to one aspect of the disclosure, the identification device may be configured to be able to match the identification data with previously stored identification data.

The previously stored identification data can be identification data that was stored in the course of a previous identification using the identification device. Alternatively, the previously stored identification data can also be target data. In particular, the target data can be stored as part of an instrument management system (IMS).

In other words, the identification device may be configured to be able to check whether an identified surgical instrument corresponds to a surgical instrument identified at an earlier time or whether several identified surgical instruments are complete at a later identification. Alternatively or additionally, the identification device may be configured to be able to check whether an identified surgical instrument corresponds to a predetermined surgical instrument (e.g. necessary for performing a particular operation) or whether a group of identified surgical instruments corresponds to a predetermined group of surgical instruments (e.g. necessary for performing a particular operation).

If identification data is compared with previously stored identification data, the security of an operation can be improved and the effort required for manual data comparison can be reduced.

According to an aspect of the disclosure, the antenna device may have an antenna extending along at least two of the side walls. In other words, the antenna of the antenna device may be configured curved such that a first portion of the antenna is arranged at a first side wall of the side walls and a second portion of the antenna angled with respect to the first portion is arranged at a second side wall of the side walls extending transversely, in particular perpendicularly, to the first side wall. The antenna can also be configured with multiple curvatures in such a way that a third portion, which is angled relative to the first and/or second portion, and possibly further portions of the antenna are arranged on a third side wall extending transversely, in particular perpendicularly, to the first and/or second side wall and possibly on further side walls of the side walls.

If a curved or angled antenna is used, penetration of the receiving space by electromagnetic waves can be improved efficiently.

According to an aspect of the disclosure, the antenna extending along at least two of the side walls may be configured such that it extends completely around the receiving space along all of the side walls.

If the antenna extends completely around the receiving space, the receiving space can be packed more tightly without unduly increasing the risk that surgical instruments located in the receiving space are not detected by the apparatus in an incorrect manner.

According to an aspect of the disclosure, the antenna device may comprise a first antenna configured on a first side wall of the side walls, and the antenna device may comprise a second antenna configured on a second side wall of the side walls, the second side wall extending transversely, in particular perpendicularly, to the first side wall and/or at a distance parallel to the first side wall. In other words, the antenna device may be configured as a system of several separate antennas, the separate antennas being arranged on different side walls of the receiving space.

If an antenna device is equipped with separate antennas, it is possible to cover a receiving space with relatively small antennas.

According to an aspect of the disclosure, the antenna device may comprise at least one inner antenna and at least one outer antenna arranged in a staggered manner such that the at least one inner antenna extends closer to the receiving space than the at least one outer antenna. The at least one inner antenna may be configured to communicate at a low frequency and the at least one outer antenna may be configured to communicate at a high frequency compared to the low frequency. In other words, the apparatus or the antenna device can be configured to detect or transmit and receive different RFID frequencies (NFC, LF, HF, UHF, SHF). The inner antenna can be configured to be able to transmit and receive LF frequencies and/or NFC frequencies. The outer antenna can be configured to transmit and receive HF frequencies. The antenna device can also be configured such that more than just two antennas are arranged in a staggered manner. For example, one antenna can be provided for each of the five frequency ranges NFC, LF, HF, UHF and SHF, whereby the antenna for the NFC frequency range is arranged closest to the receiving space and the other antennas are arranged in ascending order according to the height of the frequency ranges, i.e. with increasing distance from the receiving space.

If antennas configured for different frequencies are arranged according to their frequency range, the different detection ranges of the antennas can be utilized in an advantageous way.

According to an aspect of the disclosure, the antenna device may be partially configured in the bottom and may have a bottom antenna extending in the bottom. The bottom antenna may be fixed with respect to the bottom. Alternatively, it is possible to form the bottom antenna such that it is movable (i.e., slidable and/or rotatable) relative to the bottom. Preferably, the movable bottom antenna can be configured with a motor by means of which the bottom antenna can be moved (i.e. translated and/or rotated).

By providing a bottom antenna, the penetration of the electromagnetic waves in the receiving space can be further improved. If the bottom antenna is configured to be movable, better detection of all surgical instruments located in the receiving space can be achieved, as possible shielding effects due to an unfavorable position of an RFID transponder in relation to the antenna device can be eliminated by moving the bottom antenna.

According to one aspect of the disclosure, the apparatus can have an integrally configured trough which is dimensioned such that the trough can be inserted into the receiving space through the upper side of the receiving space. In particular, the trough may be made of plastic or stainless steel. Alternatively, the trough can also be made of anodized aluminum. A trough made of stainless steel can be manufactured in particular by deep drawing. In particular, the trough can be configured in such a way that side walls of the trough extend at least substantially parallel to the side walls of the receiving space in a state in which the trough is inserted into the receiving space. In other words, a trough can be provided which extends or can extend between the at least one instrument to be registered and the side walls and the bottom of the receiving space.

If a trough is provided, simple cleaning, for example by wipe disinfection, can be made possible in an advantageous way.

According to an aspect of the disclosure, the apparatus may be configured as a box or as a non-stationary unit, for example as a tabletop apparatus. In other words, the apparatus may have an at least substantially cuboid outer contour. In particular, the apparatus may be configured such that it is portable by a single person or has a mass between 5 kg and 20 kg.

If the apparatus is configured as a box or as a non-stationary unit, a conventional sterile processing department for medical products or a conventional operating room can be equipped with an apparatus according to the disclosure with little effort.

According to an aspect of the disclosure, the apparatus can be configured as a packing table having at least one work surface adjacent to the upper side of the receiving space, in particular extending parallel to the bottom of the receiving space. In particular, the packing table may be configured, preferably provided with table legs, such that the work surface has a working height of between 0.8 m and 1.0 m. Preferably, the work surface can be configured as a stainless steel surface. In particular, the shielding of the apparatus can be configured in such a way that it also extends along the work surface. In other words, the apparatus can be configured as a work table in which a recess is provided for registering the surgical instruments or for registering all surgical instruments of a complete strainer baskets. The shielding can be configured in such a way that instruments lying on the work surface or the work table are shielded in such a way that the antenna device cannot make any error detections of these instruments.

If the apparatus is configured as a packing table, the apparatus can be operated in an ergonomically advantageous way.

According to an aspect of the disclosure, the apparatus may have a scale configured to measure a weight of one or more surgical instruments placed in the receiving space. In other words, the apparatus may comprise a scale that measures a weight of a content of the receiving space.

If the apparatus is equipped with a scale, the application range of the apparatus can be extended in an advantageous way According to an aspect of the disclosure, the identification device may be configured to activate the antenna device upon a change in the weight measured by the scales. In other words, the apparatus may be configured such that only a surgical instrument newly introduced into the receiving space or only surgical instruments newly introduced into the receiving space or a surgical instrument removed from the receiving space or surgical instruments removed from the receiving space are registered. Whether a surgical instrument has been moved into or out of the receiving space can be detected by the apparatus via a change in weight measured by or using the scales.

If the antenna device or the antenna or antennas of the antenna device are only activated when the weight changes, the apparatus can be operated in a power-efficient manner.

According to an aspect of the disclosure, the identification device may be configured to be able to match the weight measured by the scales with a weight previously measured by the scales and/or a predetermined target weight. The predetermined target weight may in particular be a weight of a predetermined surgical instrument (for example for performing a particular operation) or of a predetermined group of surgical instruments (for example for performing a particular operation), in particular together with the weight of a package or the weight of a strainer basket.

If the apparatus is configured in such a way that the weight of a surgical instrument is monitored, it is advantageously possible to determine whether the surgical instrument has remained intact during an operation. If the weight of a group of instruments is monitored, a completeness check carried out by the identification device using RFID transponder signals can be checked in an advantageous manner.

BRIEF DESCRIPTION OF THE DRAWINGS

The present disclosure is described in more detail below with reference to the accompanying drawings with reference to preferred embodiments.

DETAILED DESCRIPTION

Figure 1:
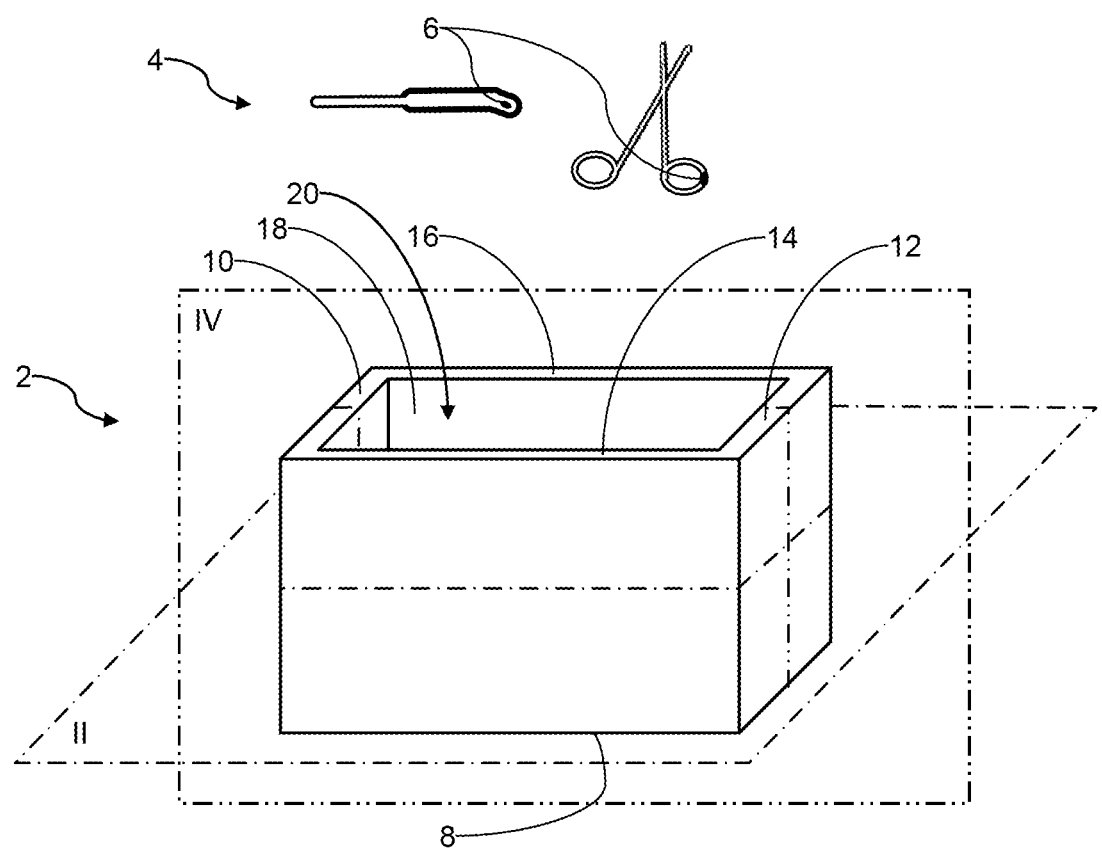
FIG. 1 shows a schematic perspective view of an apparatus with surgical instruments configured as a box according to the disclosure.

FIG. 1 shows a schematic perspective view of an apparatus 2 configured as a box according to the disclosure with surgical instruments 4. Each of the two instruments shown is provided with an RFID transponder 6.

The apparatus 2 has a substantially rectangular outer contour. This means that the apparatus has a bottom 8 (see FIG. 2) with a substantially rectangular outline, from the edges of which two opposing short side walls 10 and 12 and two opposing long side walls 14 and 16 extend to an opening 18 opposite the bottom 8. The side walls 10 to 16 and the opening 18 each have a substantially rectangular outline.

The bottom 8, the side walls 10 to 16 and the opening 18 define a receiving space 20 into which the surgical instruments 4 can be inserted via the opening 18. The receiving space 20 is delimited at the bottom by the bottom 8 and laterally by the side walls 10 to 16.

Figure 2:
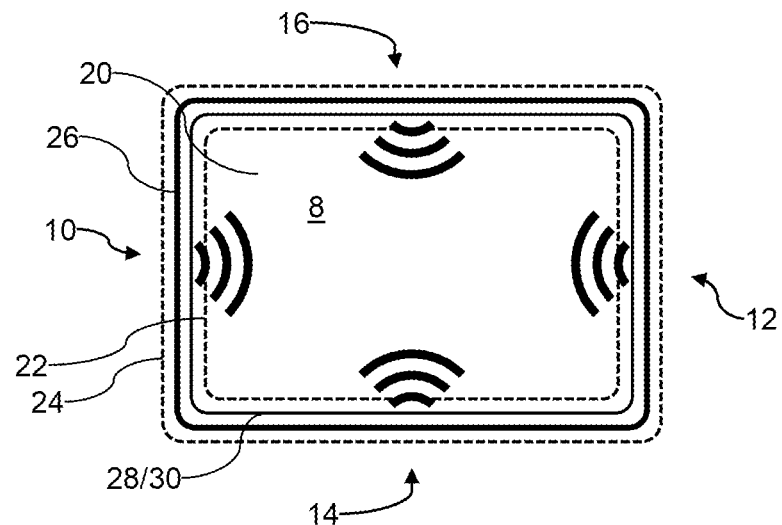
FIG. 2 shows a schematic sectional view along the plane II shown in FIG. 1, in which an antenna device is configured according to a first embodiment.

FIG. 2 shows a schematic sectional view along the plane II shown in FIG. 1, which is parallel to the bottom 8.

The outlines 22 and 24 of the side walls 10 to 12, i.e. the inner outline 22, which circumscribes the receiving space 20, and the outer outline 24, are shown as dashed lines in FIG. 2.

Along an outer contour of the bottom 8 and the side walls 10 to 16, i.e. in the sectional view in FIG. 2 along the outer outline 24 of the side walls, a shielding 26 extends in the bottom 8 or in the side walls 10 to 16 (see thick line in FIG. 2), which is configured to prevent electromagnetic waves that are transmitted outside the receiving space 20 from penetrating laterally or from below into the receiving space 20. Electromagnetic waves that are transmitted above the opening 18 can penetrate the receiving space 20. In order to also shield such electromagnetic waves, a removable lid (not shown) can be provided, by means of which the opening 18 can be closed, and the shielding 26 can also extend along an outer contour of the lid in the lid.

Between the shielding 26 and an inner contour of the side walls 10 to 16, i.e. in the sectional view in FIG. 2 between the shielding 26 and the inner outline 22, an antenna device 28 is provided according to a first embodiment. The antenna device 28 is configured by a single antenna 30, which extends completely around the receiving space 20 and has a substantially rectangular outline. The antenna 30 is configured such that portions of the antenna 30 are directed towards a center of the receiving space 20.

Figure 3:
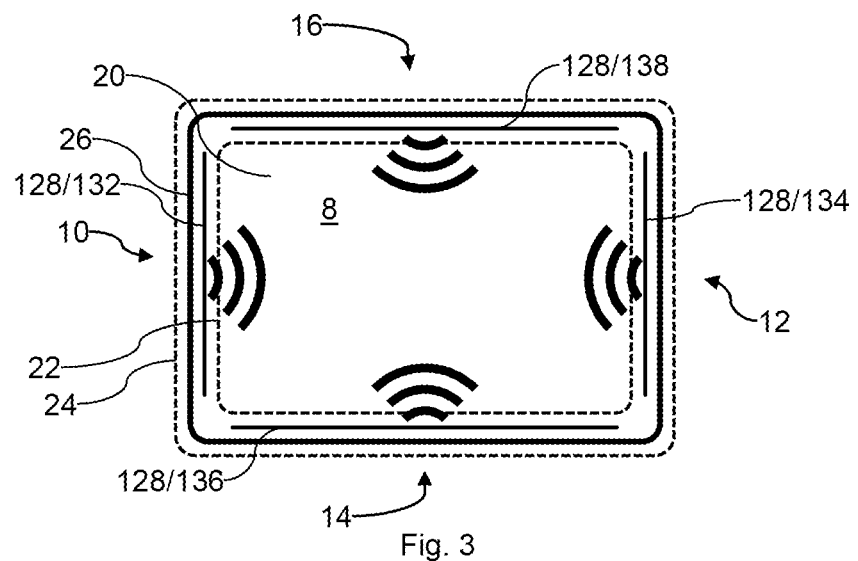
FIG. 3 shows a sectional view, corresponding to FIG. 2, of an apparatus with an antenna device according to a second embodiment.

FIG. 3 shows a sectional view of the apparatus 2 corresponding to FIG. 2 with an antenna device 128 according to a second embodiment.

The antenna device 128 has four separate antennas 132, 134, 136 and 138. Like the antenna 30 of the antenna device 28 according to the first embodiment, the antennas 132 to 138 extend between the inner contour of the side walls 10 to 16 and the shielding 26. The antenna 132 extends in the short side wall 10. The antenna 134 extends in the short side wall 12. The antenna 136 extends in the long side wall 14. The antenna 138 extends in the long side wall 16.

Figure 4:
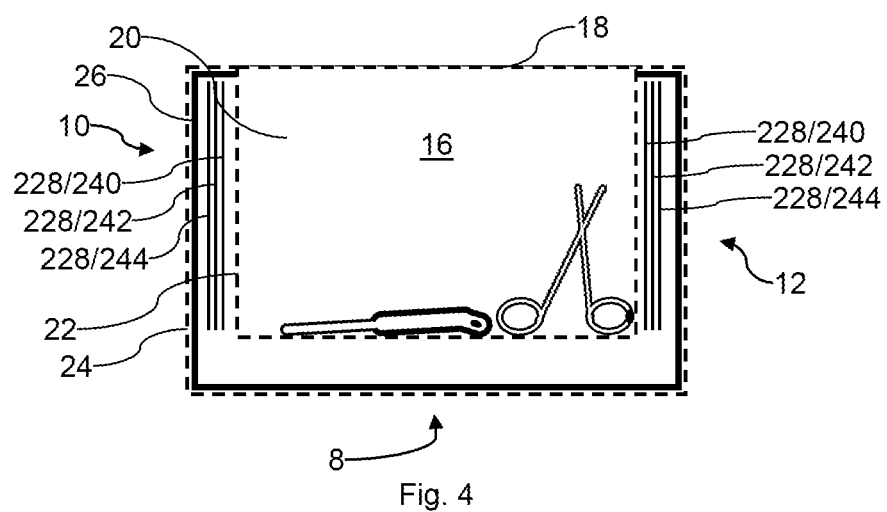
FIG. 4 shows a schematic sectional view along the plane IV shown in FIG. 1, in which an antenna device is configured according to a third embodiment.

FIG. 4 shows a schematic sectional view along the plane IV shown in FIG. 1, which is parallel to the long side walls 14 and 16. In FIG. 4, the apparatus 2 is shown with an antenna device 228 according to a third embodiment. The antenna device 228 extends between the inner contour of the side walls 10 and 12 and the shielding 26. The antenna device has an NFC antenna 240, an LF antenna 242 and an HF antenna 244 for each side wall 10 or 12. For each side wall 10 or 12, the NFC antenna 240, the LF antenna 242 and the HF antenna 244 are arranged in a staggered manner such that the NFC antenna 240 is arranged closest to the receiving space 20, the HF antenna 244 is arranged furthest away from the receiving space 20 and the LF antenna 242 is arranged between the NFC antenna 240 and the HF antenna 244.

FIG. 4 shows that the shielding 26 is configured in such a way that it not only extends along an outer contour of the bottom 8 and a lateral outer contour of the side walls 10 to 16, but also extends along the front sides opposite the bottom 8 at the free ends of the side walls 10, 12, 14 and/or 16.

Figure 5:
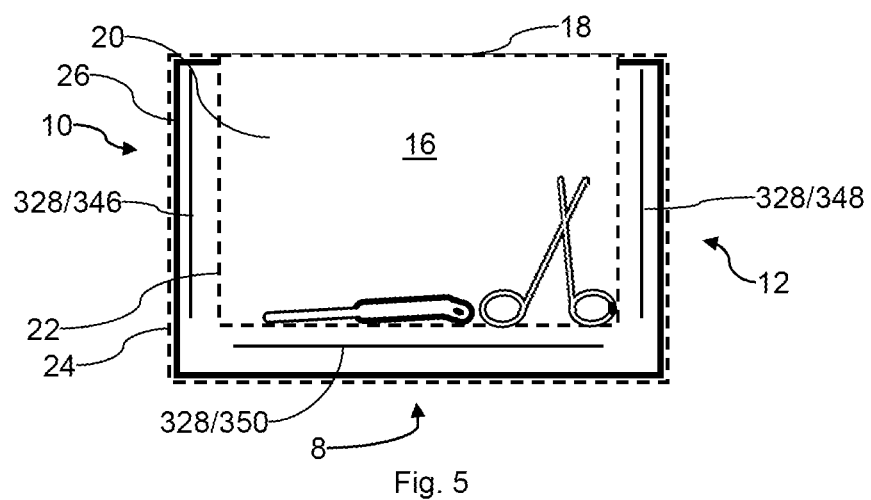
FIG. 5 shows a sectional view of the apparatus corresponding to FIG. 4 with an antenna device according to a fourth embodiment.

FIG. 5 shows a sectional view of the apparatus 2 corresponding to FIG. 4 with an antenna device 328 according to a fourth embodiment.

Like the antenna devices 28, 128 or 228 according to the first three embodiments, the antenna device 328 according to the fourth embodiment has antennas 346 and 348 in the side walls 10, 12, 14 and/or 16. In addition, the antenna device 328 is provided with a bottom antenna 350 extending between an inner contour of the bottom 8 and the shielding 26 extending along the outer contour of the bottom 8 in the bottom 8. The bottom antenna 350 of the antenna device 328 is rigidly configured, i.e. the bottom antenna 350 is not configured to be movable relative to the bottom 8.

Figure 6:
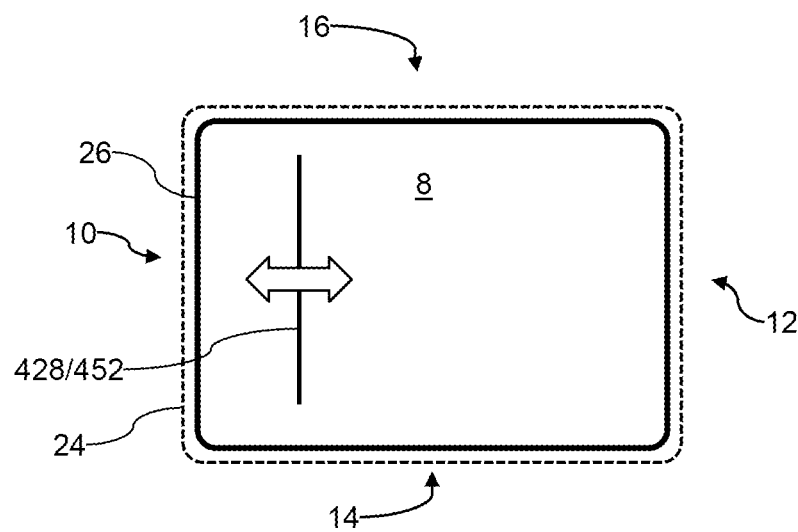
FIG. 6 shows a sectional view of a bottom of the apparatus with an antenna device according to a fifth embodiment.

FIG. 6 shows a sectional view of a bottom 8 of the apparatus 2 with an antenna device 428 according to a fifth embodiment.

Like the antenna devices 28, 128, 228 or 328 according to the first four embodiments, the antenna device 428 according to the fifth embodiment has antennas (not shown) in the side walls 10, 12, 14 and/or 16. In addition, the antenna device 428 is provided with a bottom antenna 452 extending between an inner contour of the bottom 8 and the shielding 26 extending along the outer contour of the bottom 8 in the bottom 8. The bottom antenna 452 of the antenna device 428 is configured to be displaceable, i.e. the bottom antenna 452 can be displaced in a direction parallel to the long side walls 14 and 16 (see arrow in FIG. 6). It would also be possible to configure the bottom antenna 452 in such a way that it can be moved alternatively or additionally in another direction.

Figure 7:
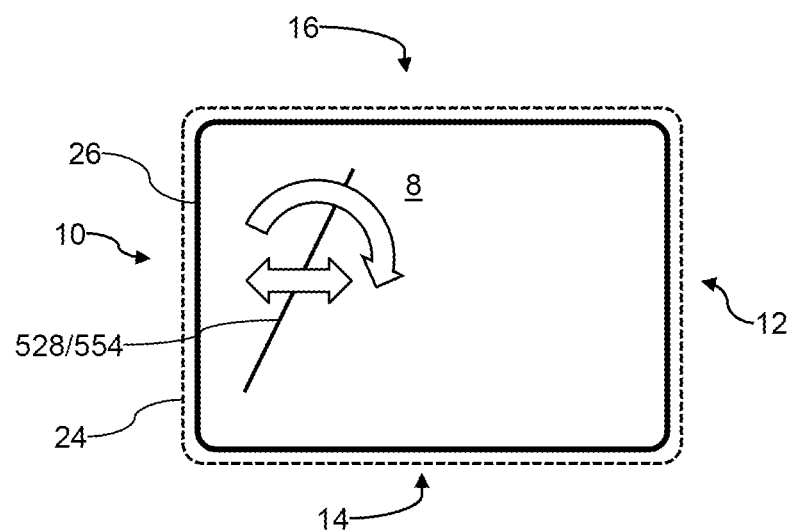
FIG. 7 shows a sectional view of the bottom of the apparatus with an antenna device according to a sixth embodiment.

FIG. 7 shows a sectional view of a bottom 8 of the apparatus 2 with an antenna device 528 according to a sixth embodiment.

Like the antenna devices 28, 128, 228, 328 or 428 according to the first five embodiments, the antenna device 528 according to the sixth embodiment has antennas (not shown) in the side walls 10, 12, 14 and/or 16. In addition, the antenna device 528 is provided with a bottom antenna 554 extending between an inner contour of the bottom 8 and the shielding 26 extending along the outer contour of the bottom 8 in the bottom 8. The bottom antenna 554 of the antenna device 528 is movably configured, i.e. the bottom antenna 554 can be moved in a direction parallel to the long side walls 14 and 16 (see straight arrow in FIG. 7) as well as rotated in the plane of the bottom 8 (see curved arrow in FIG. 7). It would also be possible to design the bottom antenna 452 in such a way that it is alternatively or additionally displaceable in another direction.

Figure 8:
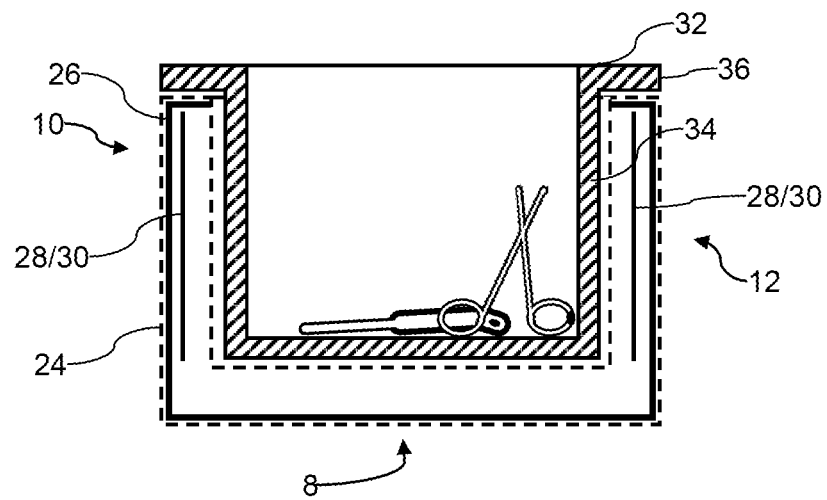
FIG. 8 shows a schematic sectional view along the plane IV shown in FIG. 1, in which the apparatus is equipped with a trough.

FIG. 8 shows a schematic sectional view along the plane IV shown in FIG. 1, in which the apparatus 2 is equipped with a trough 32. The antenna device 30 shown in FIG. 8 according to the first embodiment is only exemplary and could also be configured according to one of the other embodiments.

The trough 32 is configured as a one-piece component made of plastic and has a box-shaped substructure 34, which is dimensioned in such a way that it can dip into the receiving space 20. At the free ends of the substructure 34, a rim 36 is configured on the trough 32, which is configured in such a way that it can rest on the free ends of the side walls 10, 12, 14 and/or 16 when the substructure 34 of the trough 32 is immersed in the receiving space 20. The substructure 34 is dimensioned in such a way that an outer contour of a bottom of the trough 32 does not rest on the inner contour of the bottom 8 when the rim 36 of the trough 32 rests on the side walls 10, 12, 14 and/or 16. At the free ends of the side walls 10, 12, 14 and/or 16, measuring elements (not shown) can be configured, which represent a scale according to the disclosure.

Figure 9:
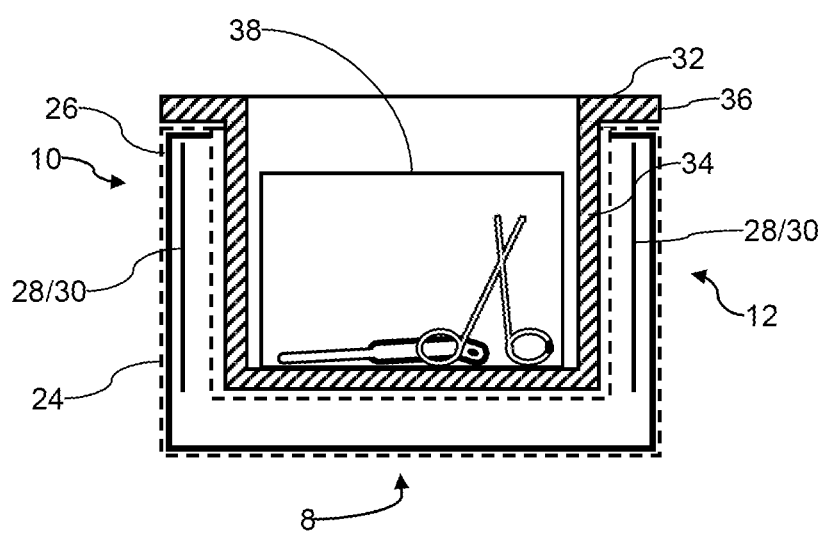
FIG. 9 shows a sectional view corresponding to FIG. 8, in which the apparatus is additionally equipped with a strainer basket.

FIG. 9 shows a sectional view corresponding to FIG. 8, in which the apparatus 2 is additionally equipped with a strainer basket 38. The strainer basket 38 is dimensioned in such a way that it can be inserted into the trough 32 or its substructure 34.

Figure 10:
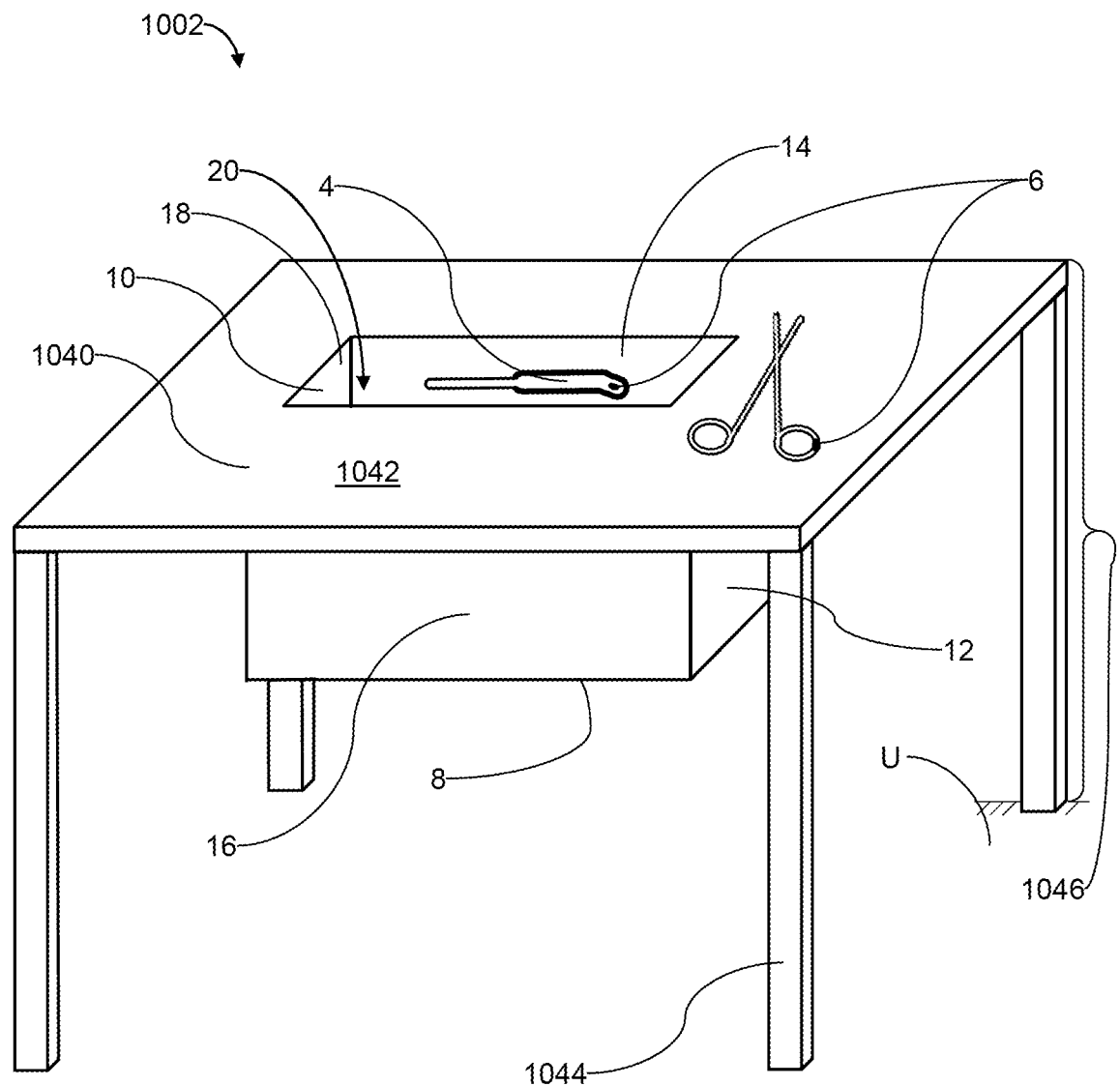
FIG. 10 shows a schematic perspective view of an apparatus with surgical instruments configured as a packing table according to the disclosure.

FIG. 10 shows a schematic perspective view of an apparatus 1002 configured as a packing table according to the disclosure with surgical instruments 4. The apparatus 1002 differs from the apparatus 2 configured as a box in that the front sides of the side walls 10 to 16 facing away from the bottom 8 are connected to a work plate 1040. In other words, the work plate 1040 has a recess in which a box according to the apparatus 2 is embedded. The work plate 1040 has a work surface 1042 which extends in the plane of the opening 18 of the receiving space 20. On a lower side of the work plate 1040 opposite the work surface 1042, table legs 1044 are provided on a rim of the work plate 1040, by means of which the apparatus 1002 can be supported on a floor U. The table legs 1044 are configured in such a way that a working height 1046 of between 0.8 m and 1.0 m is provided. The working height 1046 corresponds to a distance between the work surface 1042 and the floor U or between the work surface 1042 and supporting surfaces of the table legs 1044 or a sum of the thickness of the work plate 1040 and a length of the table legs 1044. An antenna device (not shown) of the apparatus 1002 can be configured according to one of the antenna devices of the apparatus 2. Like the apparatus 2, the apparatus 1002 can be equipped with a trough and/or a strainer basket.

The invention claimed is:

1. An apparatus for registering surgical instruments each provided with at least one RFID transponder during a reprocessing of the surgical instruments in a reprocessing unit for medical products and/or during a count check in an operating room, with
   a receiving space, wherein a lower side of the receiving space is delimited by a bottom, all sides of the receiving space are delimited by side walls and at least one of the surgical instruments can be introduced into the receiving space through an upper side of the receiving space,
   a shielding which is arranged at or in the bottom and the side walls in such a way that the receiving space is shielded at the bottom and sides from external electromagnetic waves,
   an antenna device which is configured within the shielding in at least two side walls of the side walls delimiting the receiving space and extending transversely to and/or parallel to one another in such a way that the antenna device can transmit electromagnetic waves into the receiving space and receive electromagnetic waves from the receiving space for communication with an RFID transponder at least with respect to two different sides of the receiving space, and
   an identification device which is configured, in a case in which at least one of the surgical instruments is introduced into the receiving space, to be able to identify the at least one of the surgical instruments introduced into the receiving space by means of the antenna device and to be able to store identification data corresponding to an identification of the at least one of the surgical instruments introduced into the receiving space.

2. The apparatus according to claim 1, wherein the identification device is configured to be able to compare the identification data with previously stored identification data.

3. The apparatus according to claim 1, wherein the antenna device comprises an antenna extending along at least two of the side walls.

4. The apparatus according to claim 3, wherein the antenna extending on at least two of the side walls is configured in such a way that it extends completely around the receiving space on all side walls.

5. The apparatus according to claim 1, wherein the antenna device comprises a first antenna configured on a first side wall of the side walls, and a second antenna configured on a second side wall of the side walls, the second side wall extending transversely to the first side wall and/or at a distance parallel to the first side wall.

6. The apparatus according to claim 1, wherein:
   the antenna device comprises at least one inner antenna and at least one outer antenna arranged in a staggered manner such that the at least one inner antenna extends closer to the receiving space than the at least one outer antenna, and
   the at least one inner antenna is configured to communicate at a low frequency and the at least one outer antenna is configured to communicate at a high frequency compared to the low frequency.

7. The apparatus according to claim 1, wherein the antenna device is partially configured in the bottom and comprises a bottom antenna extending in the bottom.

8. The apparatus according to claim 1, wherein the apparatus comprises an integrally configured trough which is dimensioned such that the integrally configured trough can be introduced into the receiving space through the upper side of the receiving space.

9. The apparatus according to claim 8, wherein side walls of the integrally configured trough extend at least substantially parallel to the side walls of the receiving space in a state in which the integrally configured trough is introduced into the receiving space.

10. The apparatus according to claim 1, wherein the apparatus is configured as a box.

11. The apparatus according to claim 1, wherein the apparatus is configured as a packing table having at least one work surface adjacent to the upper side of the receiving space.

12. The apparatus according to claim 11, wherein the at least one work surface extends parallel to the bottom of the receiving space.

13. The apparatus according to claim 1, wherein the apparatus comprises a scale configured to be able to measure a weight of a surgical instrument inserted into the receiving space or a plurality of surgical instruments inserted into the receiving space.

14. The apparatus according to claim 13, wherein the identification device is configured to activate the antenna device upon a change in the weight measured by the scale.

15. The apparatus according to claim 13, wherein the identification device is configured to be able to compare the weight measured by the scale with a weight previously measured by the scale and/or a predetermined target weight.

16. An apparatus for registering surgical instruments each provided with at least one RFID transponder during a reprocessing of the surgical instruments in a reprocessing unit for medical products and/or during a count check in an operating room, with
   a receiving space, wherein a lower side of the receiving space is delimited by a bottom, all sides of the receiving space are delimited by side walls and at least one of the surgical instruments can be introduced into the receiving space through an upper side of the receiving space,
   a shielding which is arranged at or in the bottom and the side walls in such a way that the receiving space is shielded at the bottom and sides from external electromagnetic waves,
   an antenna device which is configured within the shielding in at least two side walls of the side walls delimiting the receiving space and extending transversely to and/or parallel to one another in such a way that the antenna device can transmit electromagnetic waves into the receiving space and receive electromagnetic waves from the receiving space for communication with an RFID transponder at least with respect to two different sides of the receiving space, and
   an identification device which is configured, in a case in which at least one of the surgical instruments is introduced into the receiving space, to be able to identify the at least one of the surgical instruments introduced into the receiving space by means of the antenna device and to be able to store identification data corresponding to an identification of the at least one of the surgical instruments introduced into the receiving space;
   wherein:

the antenna device comprises at least one inner antenna and at least one outer antenna arranged in a staggered manner such that the at least one inner antenna extends closer to the receiving space than the at least one outer antenna, and the at least one inner antenna is configured to communicate at a low frequency and the at least one outer antenna is configured to communicate at a high frequency compared to the low frequency.

\* \* \* \* \*